United States Patent [19]
Mamiya et al.

[11] Patent Number: 5,785,339
[45] Date of Patent: Jul. 28, 1998

[54] SUSPENSION DEVICE FOR A BICYCLE

[75] Inventors: Atsushi Mamiya; Naoki Tsuji, both of Atsugi, Japan

[73] Assignees: Itochu Corporation, Osaka; Tokyo R&D Co., Ltd., Tokyo, both of Japan

[21] Appl. No.: 729,647

[22] Filed: Oct. 21, 1996

[30] Foreign Application Priority Data

Oct. 23, 1995 [JP] Japan .................................. 7-274450

[51] Int. Cl.⁶ ............................................ B62K 3/02
[52] U.S. Cl. ................................................. 280/283
[58] Field of Search ............................ 280/275, 283, 280/284, 285, 286

[56] References Cited

U.S. PATENT DOCUMENTS

| | | | |
|---|---|---|---|
| 519,855 | 5/1894 | Whitaker | 280/283 |
| 2,187,238 | 1/1940 | Judd | 280/283 |
| 4,732,404 | 3/1988 | Coetzee | 280/283 |
| 5,417,445 | 5/1995 | Smart | 280/275 |
| 5,498,013 | 3/1996 | Hwang | 280/283 |

FOREIGN PATENT DOCUMENTS

| | | |
|---|---|---|
| 47-17138 | 9/1972 | Japan . |
| 54-49735 | 4/1975 | Japan . |
| 50-69735 | 6/1975 | Japan . |
| 50-88746 | 7/1975 | Japan . |
| 57-55254 | 4/1982 | Japan . |
| 59-137269 | 8/1984 | Japan . |
| 59-171773 | 9/1984 | Japan . |
| 61-268577 | 9/1986 | Japan . |
| 63-64889 | 3/1988 | Japan . |
| 1-117988 | 8/1989 | Japan . |
| 4-38288 | 2/1992 | Japan . |
| 4-71979 | 3/1992 | Japan . |
| 4-95595 | 3/1992 | Japan . |
| 5-278666 | 10/1993 | Japan . |
| 6-16186 | 3/1994 | Japan . |
| 175955 | 11/1921 | United Kingdom ............ 280/283 |

*Primary Examiner*—Kevin Hurley
*Attorney, Agent, or Firm*—McAulay Fisher Nissen Goldberg & Kiel, LLP

[57] ABSTRACT

According to the present invention, there is provided a suspension device for a bicycle comprising a center frame for supporting a saddle; a front frame for supporting a front wheel at a first end of the front frame, the front frame being secured to the center frame at a second end of the front frame so as to pivot about a first pivot axis; a rear frame for supporting a rear wheel at a first end of the rear frame, the rear frame being secured to the center frame at a second end of the rear frame so as to pivot about a second pivot axis different from and spaced from the first pivot axis; and a plate spring which is secured to the front frame at a first end of the plate spring, is secured to the rear frame at a second end of the plate spring, and is fixed to the center frame at an intermediate portion of the plate spring, whereby the front and rear frames are resiliently supported relative to the center frame by means of the plate spring.

7 Claims, 9 Drawing Sheets

SUSPENSION DEVICE FOR A BICYCLE

BACKGROUND OF THE INVENTION

1. Field of the Invention

The invention relates to a suspension device for a bicycle.

2. Description of the Related Art

A suspension device for a bicycle is proposed, using a plate spring to absorb shocks due to bumps in the ground, to enhance the comfort of the bicycle's ride. In Japanese Unexamined Patent Publication (Kokai) No. 63-64889, for example, a suspension device for a bicycle is disclosed, in which a front frame for supporting a front wheel at an end thereof and a rear frame for supporting a rear wheel at an end thereof are rotatably connected to each other about a common axis at their other ends, an end of a plate spring is secured to the front frame, and the second end of the plate spring is secured to the rear frame. Further, a seat tube for supporting a saddle is secured to the front and rear frames via the plate spring about the same axis as the above common axis, and the load of a rider sitting on the saddle acts on the connecting portion of the front frame, the rear frame and the seat tube via the plate spring.

In the above suspension device, the single common axis must receive all forces acting on the body of the bicycle, and therefore, there is a problem in that, in order to strengthen the bearing portion in the area of the pivot axis, the bearing portion becomes big and the structure of the bearing portion becomes complex. Further, in the case of a common bicycle provided with a rear suspension, there is a problem called "pedaling loss", in which the rear wheel is moved up and down relative to the pivot axis by the driving of the pedals, and therefore, the force of the drive of the pedal cannot be suitably transferred to the rear wheel.

In order to prevent the occurrence of the above pedaling loss, it is necessary to adjust the position of the pivot axis to the most suitable position under the various conditions of operation. However, according to the suspension device disclosed in the above publication, the front frame, the rear frame, and the seat tube are all connected to each other at a single pivot axis so that there is a problem in that the pivot axis may not be positioned at the most suitable position to prevent pedaling loss. Although the suspension features are determined by the trajectory of the motion of the front and rear wheels under various conditions, there is a problem in that the flexibility of setting the trajectory of the motion of the front and rear wheels is reduced and the most suitable suspension features may not be obtained if the front frame, the rear frame, and the seat tube are all connected to each other at single common axis according to the suspension device disclosed in the above publication.

SUMMARY OF THE INVENTION

Accordingly, the object of the invention is to provide a suspension device for a bicycle which reduces pedal loss when the suspension device supports the front and rear frames of the bicycle, the structure of which is simple, small, and light.

According to the present invention, there is provided a suspension device for a bicycle comprising a center frame for supporting a saddle; a front frame for supporting a front wheel at a first end of said front frame, said front frame being secured to said center frame at a second end of said front frame so as to pivot about a first pivot axis; a rear frame for supporting a rear wheel at a first end of said rear frame, said rear frame being secured to said center frame at a

2 second end of said rear frame so as to pivot about a second pivot axis different from and spaced from said first pivot axis; and a plate spring which is secured to said front frame at a first end of said plate spring, is secured to said rear frame at a second end of said plate spring, and is fixed to said center frame at an intermediate portion of said plate spring, whereby said front and rear frames are resiliently supported relative to said center frame by means of said plate spring.

The present invention may be more fully understood from the description of the preferred embodiments of the invention set forth below, together with the accompanying drawings.

DESCRIPTION OF THE PREFERRED EMBODIMENTS

Figure 1:
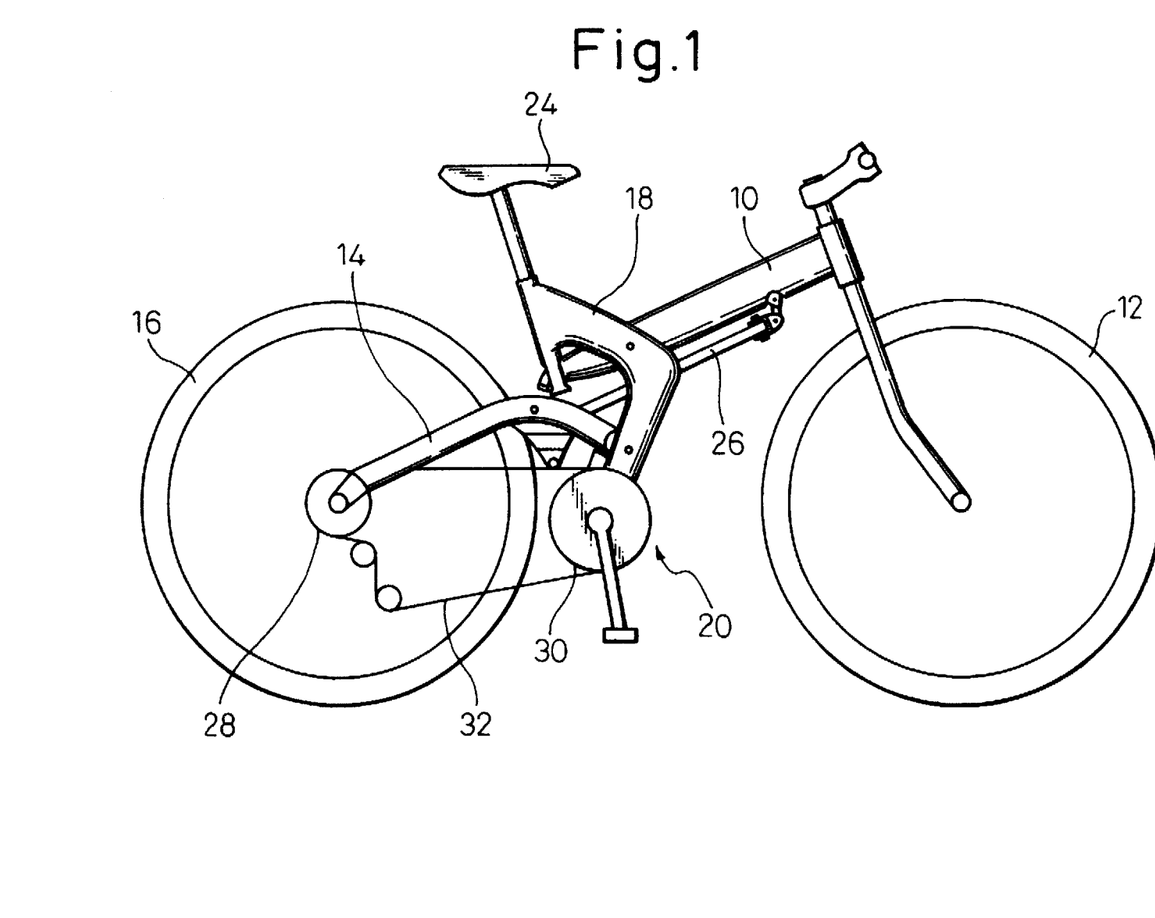
FIG. 1 is a general view of a bicycle provided with the suspension device of the invention.

FIG. 1 shows a first embodiment of a suspension device according to the invention. In FIG. 1, reference number 10 is a front frame for supporting a front wheel 12 at first end thereof, and 14 is a rear frame for supporting a rear wheel 16 at a first end thereof. The front frame and the rear frame are connected to each other by means of a center frame 18 which is vertically elongated. The center frame 18 supports a bottom bracket 20 for supporting a driving force input mechanism, i.e. a pedal crank, or a bearing portion for bearing a pedal crank at its bottom end and a saddle 24 at its upper end. A plate spring 26 extends between the front frame 10 and the rear frame 14 through the center frame 18. The rear wheel 16 is provided with a rear chain sprocket 28, and a drive chain 32 is hung around the front and rear chain sprockets 30 and 28, and therefore, the front and rear chain sprockets 30 and 28 are connected to each other.

Figure 2:
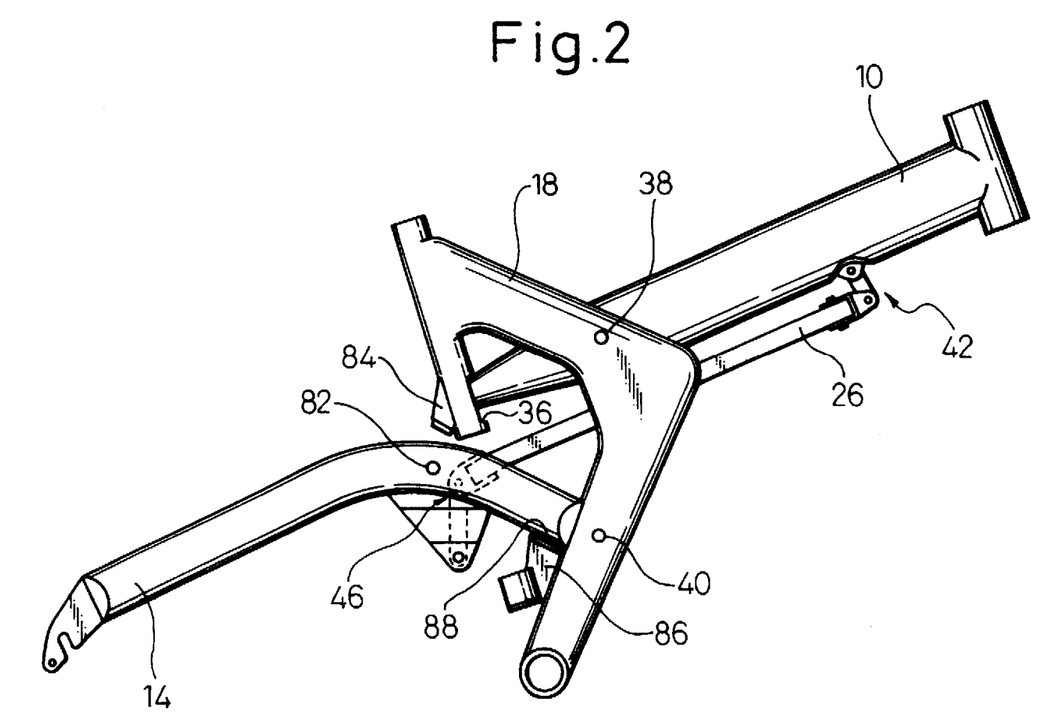
FIG. 2 is a side view of the main part of the suspension device of the invention.
Figure 3:
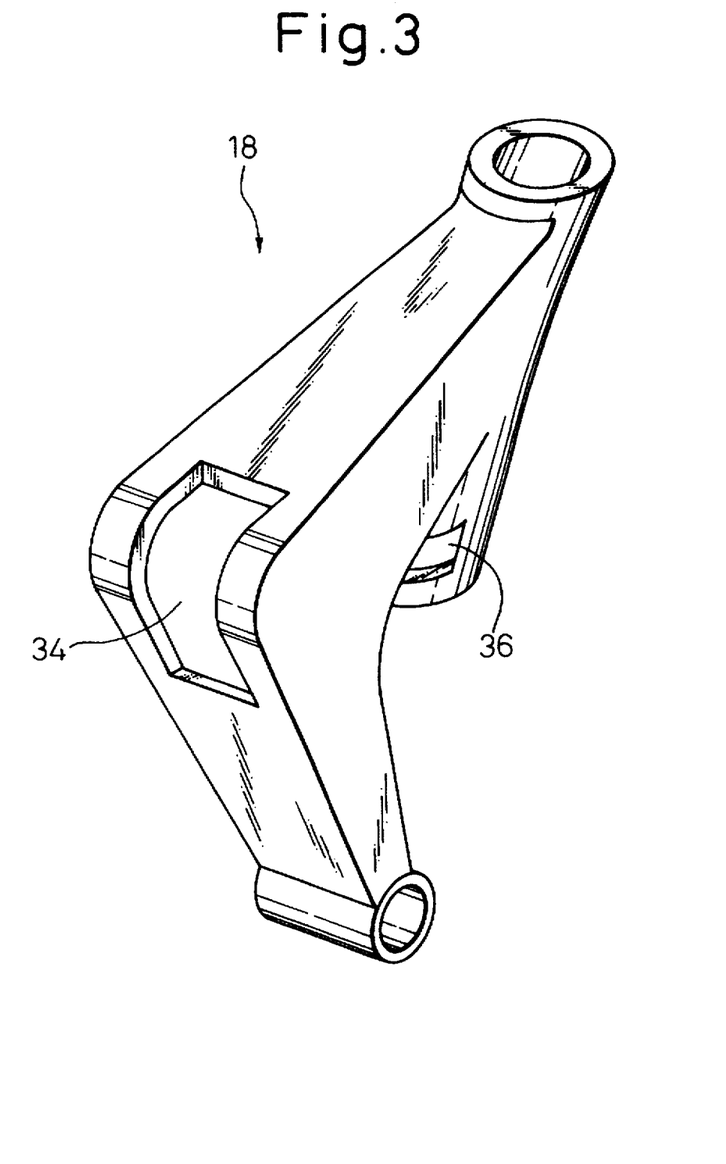
FIG. 3 is a perspective view of the center frame of the suspension device of the invention.

FIGS. 2 and 3 show the details of the suspension device according to the invention. The front frame 10 extends through the opening 34 formed in the center frame 18 at a second end of the front frame 10, and the tip of a second end of the front frame 18 is received into a slot 36 provided in the center frame 18. The front frame 10 is secured to the center frame 18 in such a way that the front frame 10 can rotate about the pivot axis 38 within the first opening 34 of the center frame 18. The rear frame 14 is secured to the center frame 18 in such a way that the rear frame 14 can rotate about the pivot axis 40 which is different from the pivot axis 38 of the front frame 10 and is vertically downwardly spaced from the pivot axis 38 of the front frame 10 at the second end of the rear frame 14. Therefore, the pivot axes 38 and 40 are on opposite sides of the plane of the plate spring 26. The position of these pivot axes 38 and 40 may be changed in the up-and-down direction, or in the back-and-forth direction so as to obtain the most suitable suspension feature according to the intended use of the bicycle. The plate spring 26 positioned between the front frame 10 and the rear frame 14 is generally flat, and is made from, for example, reinforced fibers, and serves as a means for absorbing the shocks received by the bicycle. The plate spring 26 is secured to the front frame 10 by means of a first connecting mechanism 42 at a first end of the plate spring 26, extends through the opening 34 of the center frame 18 (FIG. 3) at its intermediate portion, and is secured to the rear frame 14 by means of a second connecting mechanism 46 at a second end of the plate spring 26.

Figure 4:
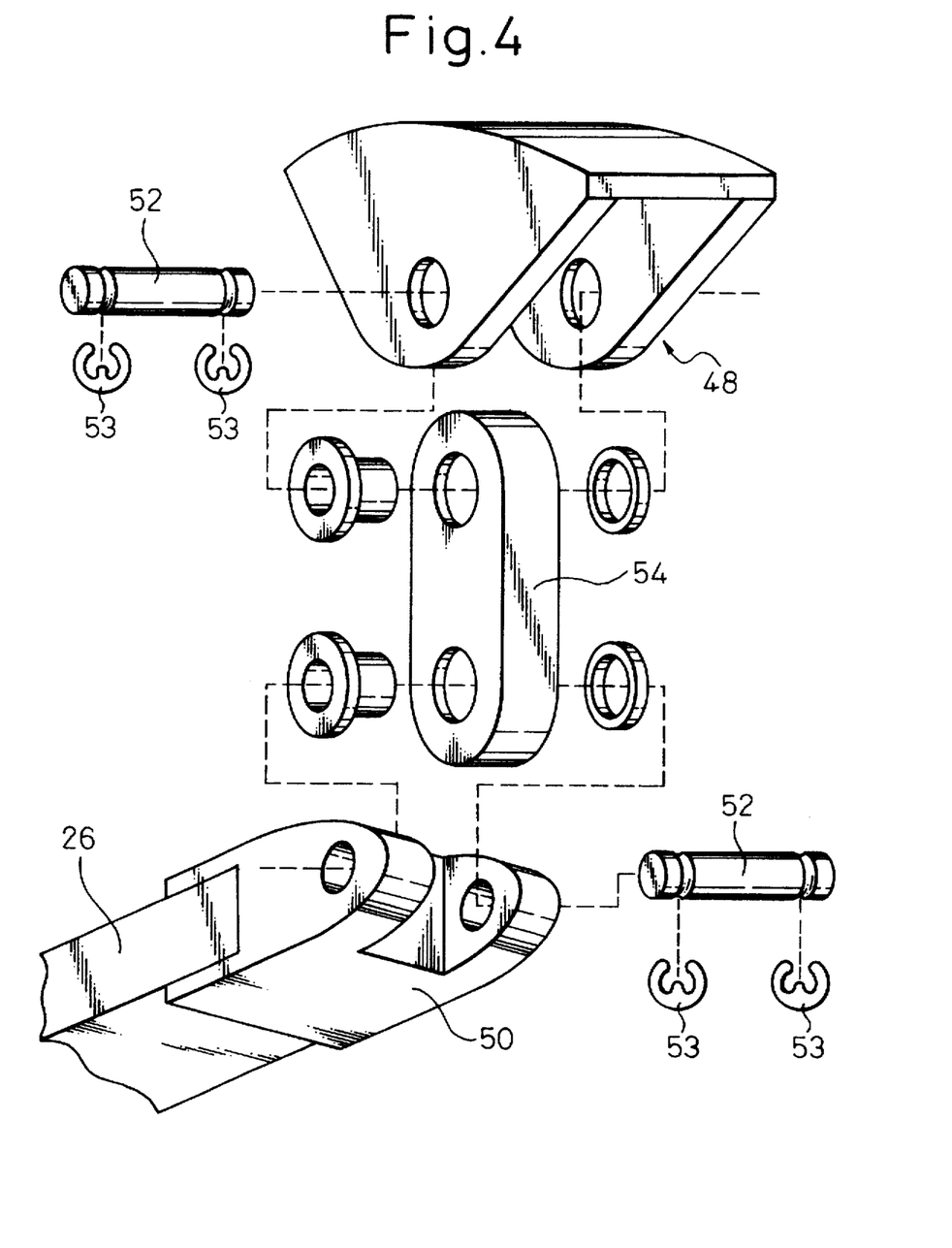
FIG. 4 is a perspective view of the connecting mechanism for connecting the front frame to the plate spring of the suspension device of the invention.

FIG. 4 shows the details of the first connecting mechanism 42. The first connecting mechanism 42 has a first connecting portion 48 provided on the front frame 10, a second connecting portion 50 fixed to the first end of the plate spring 26, a link member which connects the first and second connecting portions 48 and 50 to each other by means of pins 52 and clips 53. Each of the connecting portions 48 and 50 is rotatably connected to the link member 54 so that the relative position of the plate spring 26 relative to the front frame 10 can be variable. The second connecting mechanism 46 for connecting the plate spring 26 to the rear frame 14 has the same structure as the first connecting mechanism 42. Instead of the above connecting mechanisms 42 and 46, the plate spring 26 may be connected to the front frame 10 by means of a resilient body, e.g. rubber, or a rolling body or low-frictional body, e.g. a roller.

Figure 5:
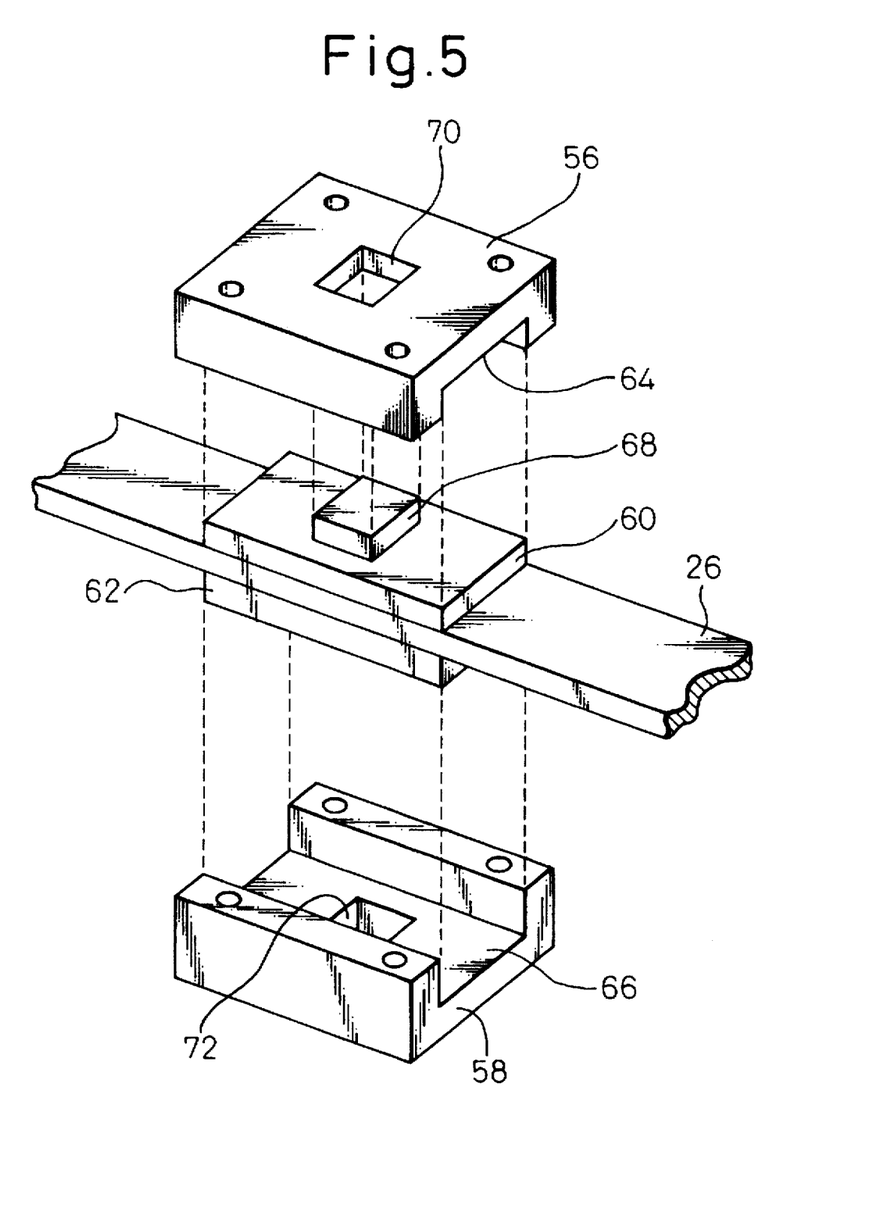
FIG. 5 is a perspective view of the fixing member for fixing the plate spring to the center frame of the suspension device of the invention.

FIG. 5 shows the manner of fixing the plate spring 26. The plate spring 26 is fixed to the center frame 18 by means of a pair of fixing members 56 and 58 positioned in the first opening 34. A first fixing member 58 is fixed to the center frame 18, for example, by welding, and the second fixing member 56 is fixed to the first fixing member 58, for example, by a bolt and a nut (not shown) so as to clamp the plate spring 26 in place. Cushions 60 and 62, made for example of rubber, are bonded to the upper and bottom surfaces of the plate spring 26, respectively, grooves 64 and 66 for receiving the plate spring 26 and cushions 60 and 62, and holes 70 and 72, which receive a projection 68 of the cushions 60 and 62 (the bottom-side projection is invisible) and are complemental to the projection 68, are provided in the fixing member 56 and 58. Fixing the plate spring 26 in the above manner prevents the plate spring 26 from sliding between the fixing members 56 and 58. The fixing position of the plate spring 26 may be varied in consideration of the type of the shocks the front or rear wheel 12 or 14 will be subjected to. It is appreciated that the resilient features of the plate spring 26 may be selected in consideration of the environment in which the bicycle will be used. The plate spring 26 is bent by shocks at the fixing members 56 and 58 serving as the fulcrum by the rotating motion of the front or rear frame 10 or 14, to absorb the shocks. Therefore, the front and rear frames are resiliently supported on the center frame by means of the plate spring.

Figure 6:
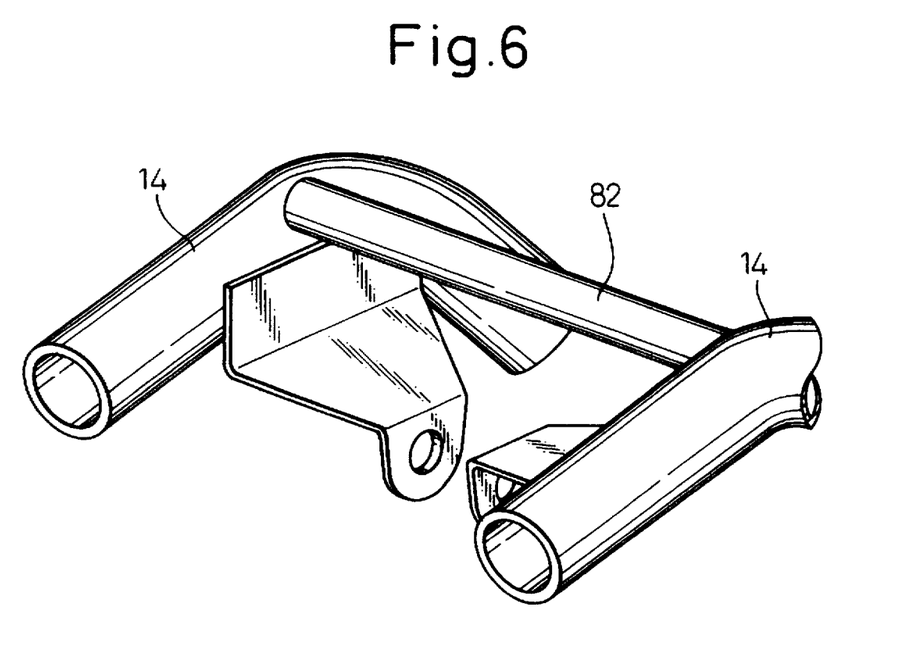
FIG. 6 is a perspective view of the bar constituting the bump stopper mechanism of the rear frame of the invention.
Figure 7:
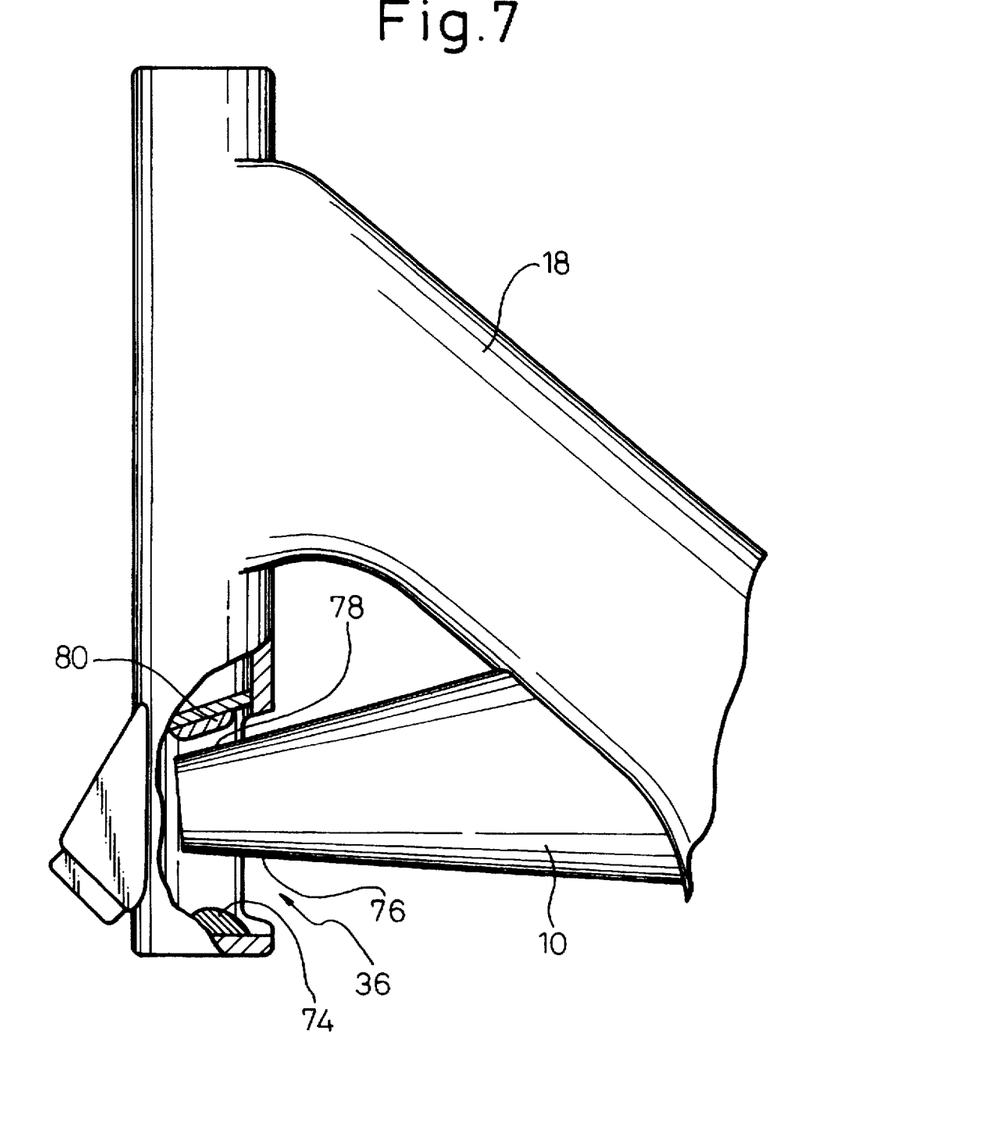
FIG. 7 is a partial cross section of the stopper mechanism of the invention.

In this embodiment according to the invention, stopper mechanisms are provided to prevent the front and rear frames 10 and 14 from rotating beyond a predetermined extent relative to the center frame 18. FIG. 7 is an enlarged cross section of the tip of the second end of the front frame 10 and the slot 36 of the center frame 18. The stopper mechanism of the front frame 10 is constituted by the tip of the front frame 10 and the slot 36 provided on the center frame 18. As mentioned above, the tip of the front frame 10 projects into the slot 36 of the center frame 18, and the vertical length of the slot 36 is longer than the vertical diameter of the front frame 10 corresponding to the slot 36 so that the tip of the front frame 10 can move within the up-and-down length of the slot 36. A bump stopper mechanism is constituted by a resilient body 74, for example, made of rubber, which is provided on a bottom surface inside the slot 36 and the bottom surface 76 of the second end of the front frame 10 so that the extent of the counterclockwise (bending direction of the plate spring 26) rotation of the front frame 10 in the drawings is limited, and a rebound stopper mechanism is constituted by an upper surface 78 of the second end of the front frame 10 and a resilient body 80, for example, made of rubber, which is provided on an upper surface inside the slot 36 so that the extent of the clockwise rotation (returning direction of the plate spring 26) of the front frame 10 in the drawing is limited. Again referring to FIG. 2, as a stopper mechanism for the rear frame 14, a bump stopper mechanism is constituted by a bar 82 extending between the rear frame 14 (FIG. 6) and a projection 84 provided on a rear portion of the center frame 18 so that the extent of the clockwise (bending direction of the plate spring) rotation of the rear frame 14 in FIG. 2 is limited, and a rebound stopper mechanism is constituted by a projection 86 provided on a bottom end of the center frame 18 and a bottom surface 88 of the second end of the rear frame 14 so that the extent of the counterclockwise (returning direction of the plate spring) rotation of the rear frame 14 in FIG. 2 is limited.

In the suspension device constituted as described the above, the front frame, the rear frame and the plate spring are connected to each other by means of the center frame so that the trajectory of the motion of the front and rear wheels can be independently and freely set, and the position of the pivot axis of the rear frame can be set in the most suitable position according to the trajectory of the motion of the rear frame so as to minimize the pedaling loss. Therefore, the flexibility to optimize the design of the suspension is considerably increased. The force loaded on the bicycle is divided over each of the pivot axes so that the suspension device becomes small and light, and the cost of producing the suspension device is reduced.

Figure 8:
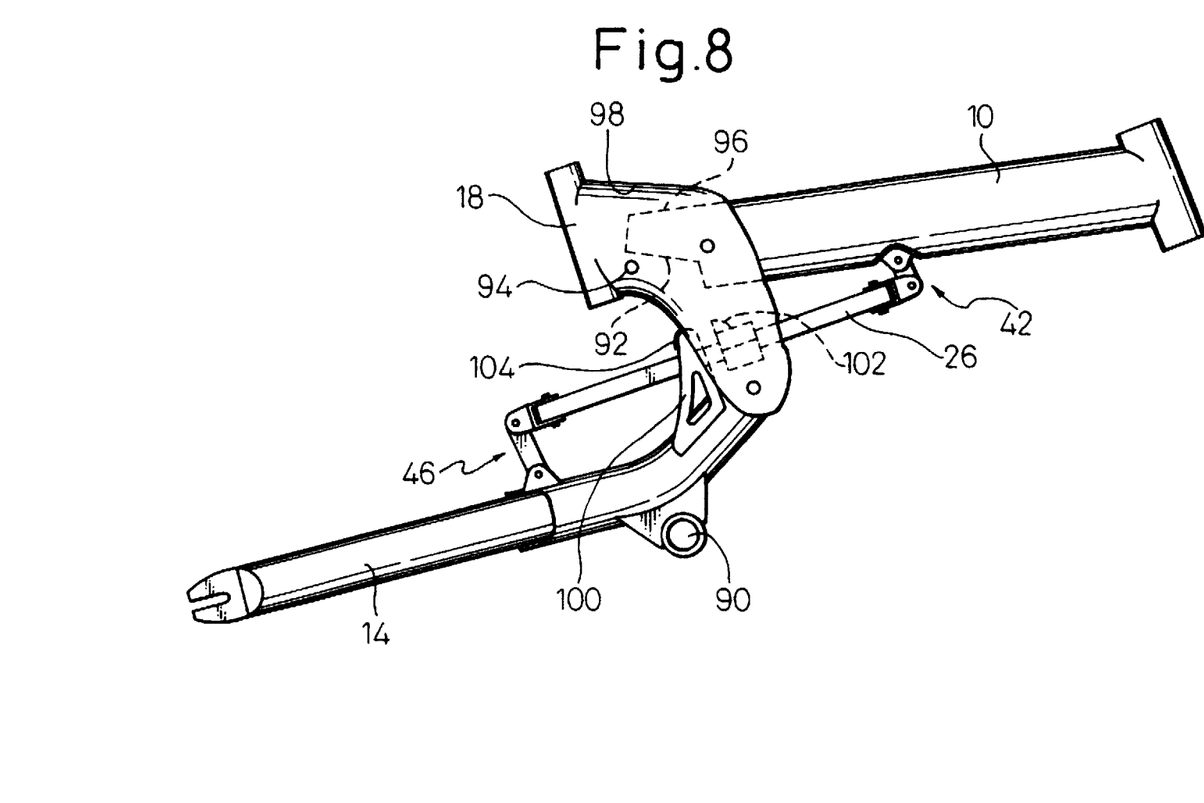
FIG. 8 is a side view of the main part of the suspension device of the second embodiment of the invention.

FIG. 8 shows a second embodiment according to the invention. The basic structure is the same as the first embodiment, except for the fixing position of the bottom bracket and stopper mechanisms. In the second embodiment, a bottom bracket 90 is provided on the second end of the rear frame 14 so that the center frame 18 becomes small, and therefore the whole size of the suspension device becomes small. As the stopper mechanism of the front frame 10, a bump stopper mechanism is constituted by a bottom surface 92 of the second end of the front frame 10 and a bar 94 horizontally extending in the center frame 18, and a rebound stopper mechanism is constituted by an upper surface 96 of the second end of the front frame 10 and an upper inner surface 98 of the center frame 18. As a stopper mechanism of the rear frame 14, a bump stopper mechanism is constituted by the front surfaces of projecting members 100 provided on the second end of the rear frame 14 and a rear surface of the projecting member 102 provided on the fixing member 56 of the plate spring 26, and a rebound stopper mechanism is constituted by the rear surfaces of projecting members 100 and a projecting member 104 provided on the center frame 18.

Figure 9:
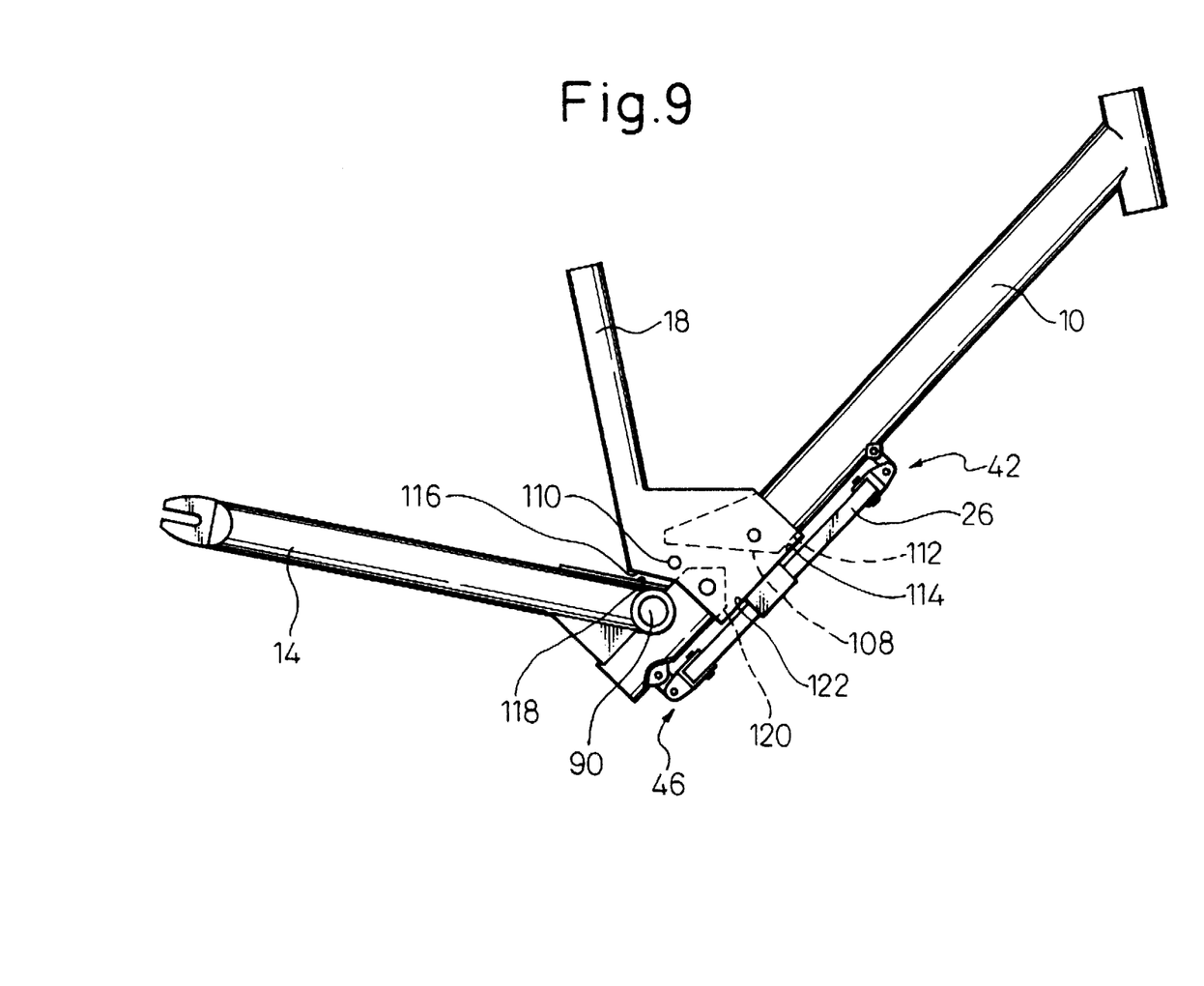
FIG. 9 is a side view of the main part of the suspension device of the third embodiment of the invention.

FIG. 9 shows a third embodiment according to the invention. The basic structure is substantially the same as the first embodiment, except that two pivot axes are positioned at one side relative to the plate spring, and except for the fixing position of the bottom bracket and the stopper mechanisms. In the third embodiment, as in the second embodiment, a bottom bracket 90 is provided on the second end of the rear frame 14. As the stopper mechanism of the front frame 10, a bump stopper mechanism is constituted by a bottom surface 108 of the second end of the front frame 10 and a bar 110 horizontally extending in the center frame 18, and a rebound stopper mechanism is constituted by a bottom surface 112 of the second end of the front frame 10 which is near the front wheel, and a lower inner surface 114 of the center frame 18. As a stopper mechanism of the rear frame 14, a bump stopper mechanism is constituted by a lower outer surface 116 of the center frame 18 and upper surface 118 of the rear frame 14, and a rebound stopper mechanism is constituted by a bottom surface 120 of the second end of the rear frame 14 and a lower inner surface 122 of the center frame 18. By constituting the above, a structure may be formed such that the frames do not interfere with the user's getting on and off the bicycle. The second and third embodiments have the same effects as the first embodiment.

According to the suspension device for a bicycle of the present invention, it is possible to provide a suspension device for a bicycle which reduces pedal loss during the operation of the bicycle, the structure of which is simple, small, and light.

While the invention has been described by reference to specific embodiments chosen for purposes of illustration, it should be apparent that numerous modifications can be made thereto by those skilled in the art without departing from the basic concept and scope of the invention.

We claim:

1. A suspension device for a bicycle, comprising;

a center frame for supporting a saddle;

a front frame for supporting a front wheel at a first end of said front frame, said front frame being secured to said center frame at a second end of said front frame so as to pivot about a first pivot axis;

a rear frame for supporting a rear wheel at a first end of said rear frame, said rear frame being secured to said center frame at a second end of said rear frame so as to pivot about a second pivot axis different from and spaced from said first pivot axis; and a plate spring which is secured to said front frame at a first end of said plate spring, is secured to said rear frame at a second end of said plate spring, and is fixed to said center frame at an intermediate portion of said plate spring, whereby said front and rear frames are resiliently supported relative to said center frame by means of said plate spring.

2. A suspension device for a bicycle according to claim 1, wherein said pivot axes are on opposite sides of the plane of said plate spring.

3. A suspension device for a bicycle according to claim 1, comprising a bump stopper mechanism to limit the extent of the pivoting motion of said front frame, said bump stopper mechanism being constituted by said front frame and said center frame.

4. A suspension device for a bicycle according to claim 1, comprising a bump stopper mechanism to limit the extent of the pivoting motion of said rear frame, said bump stopper mechanism being constituted by said rear frame and said center frame.

5. A suspension device for a bicycle according to claim 1, wherein a driving force input mechanism is provided in said center frame.

6. A suspension device for a bicycle according to claim 5, wherein said driving force input mechanism is a pedal crank.

7. A suspension device for bicycle according to claim 1, wherein a bearing portion for bearing a pedal crank is provided in said rear frame.

* * * * *